US010300653B2

(12) United States Patent
Hackett, Jr.

(10) Patent No.: US 10,300,653 B2
(45) Date of Patent: May 28, 2019

(54) FORMATION OF THERMOPLASTIC PARTS

(71) Applicant: The Boeing Company, Chicago, IL (US)

(72) Inventor: Andrew Roy Hackett, Jr., Lynnwood, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/679,842

(22) Filed: Aug. 17, 2017

(65) Prior Publication Data

US 2017/0341289 A1 Nov. 30, 2017

Related U.S. Application Data

(63) Continuation of application No. 14/182,649, filed on Feb. 18, 2014, now Pat. No. 9,844,904.

(51) Int. Cl.
B29C 51/02 (2006.01)
B29C 51/10 (2006.01)
(Continued)

(52) U.S. Cl.
CPC .............. *B29C 51/02* (2013.01); *B29C 51/10* (2013.01); *B29C 51/18* (2013.01); *B29C 51/263* (2013.01); *B29C 51/264* (2013.01); *B29C 51/36* (2013.01); *B29C 51/42* (2013.01); *B29C 51/46* (2013.01); *B29C 64/10* (2017.08); *B29C 64/147* (2017.08); *B29C 64/188* (2017.08); *B29C 64/20* (2017.08); *B33Y 80/00* (2014.12); *C08J 5/00* (2013.01); *B29C 51/28* (2013.01); *B29C 51/30* (2013.01); *B29C 2791/006* (2013.01); *B29K 2101/12* (2013.01); *B29L 2022/00* (2013.01); *B29L 2031/757* (2013.01); *B29L 2031/768* (2013.01);
(Continued)

(58) Field of Classification Search
CPC ............. B29C 51/30; B29C 67/0051–67/0096
See application file for complete search history.

(56) References Cited

U.S. PATENT DOCUMENTS 4,751,121 A 6/1988 Kuehnel et al.
2007/0029698 A1* 2/2007 Rynerson .............. B22F 3/1055
264/219

(Continued)

FOREIGN PATENT DOCUMENTS

JP 2001079934 A 3/2001
WO WO0116428 A1 3/2001
WO WO2006011878 A1 2/2006

OTHER PUBLICATIONS

Extended European Search Report, dated Jul. 21, 2015, regarding Application No. EP15153805.5, 9 pages.
(Continued)

Primary Examiner — Benjamin A Schiffman
(74) Attorney, Agent, or Firm — Yee & Associates, P.C.

(57) ABSTRACT

A method and apparatus is presented. A portion is cut from a thermoplastic sheet of a first thermoplastic material based on a three dimensional model. The portion is secured to a mold. The portion and the mold are heated under vacuum to form a structure. The structure may take the form of a protective covering. In some illustrative examples, the mold may be formed of a second thermoplastic material based on the three dimensional model using additive manufacturing.

5 Claims, 12 Drawing Sheets

(51) Int. Cl.

| | | |
|---|---|---|
| *B29C 51/36* | (2006.01) | |
| *B33Y 80/00* | (2015.01) | |
| *B29C 64/20* | (2017.01) | |
| *B29C 64/10* | (2017.01) | |
| *B29C 51/18* | (2006.01) | |
| *B29C 51/26* | (2006.01) | |
| *B29C 51/42* | (2006.01) | |
| *B29C 51/46* | (2006.01) | |
| *C08J 5/00* | (2006.01) | |
| *B29C 64/147* | (2017.01) | |
| *B29C 64/188* | (2017.01) | |
| *B29L 31/00* | (2006.01) | |
| *B29C 51/28* | (2006.01) | |
| *B29C 51/30* | (2006.01) | |
| *B33Y 10/00* | (2015.01) | |
| *B33Y 30/00* | (2015.01) | |
| *B33Y 50/00* | (2015.01) | |
| *B29K 101/12* | (2006.01) | |
| *B29L 22/00* | (2006.01) | |

(52) U.S. Cl.
CPC ............... *B33Y 10/00* (2014.12); *B33Y 30/00* (2014.12); *B33Y 50/00* (2014.12); *C08J 2300/22* (2013.01); *Y10T 428/1397* (2015.01)

(56) References Cited

U.S. PATENT DOCUMENTS

| 2007/0241021 | A1 | 10/2007 | Hiltunen et al. |
| 2010/0102476 | A1 | 4/2010 | Higgins |
| 2015/0231818 | A1 | 8/2015 | Hackett, Jr. |

OTHER PUBLICATIONS

Canadian Office Action, dated Jan. 30, 2017, regarding Application No. 2,876,170, 3 pages.
"KYDEX 100: High impact fire-rated sheet," KYDEX, LLC, Technical Data Sheet, copyright 2011, 2 pages, accessed Feb. 18, 2014. http://www.kydex.com/Uploads/All/Kydex/Products/KYDEX%C2%AE%20100%20Technical%20Data%20Sheet.pdf.

\* cited by examiner

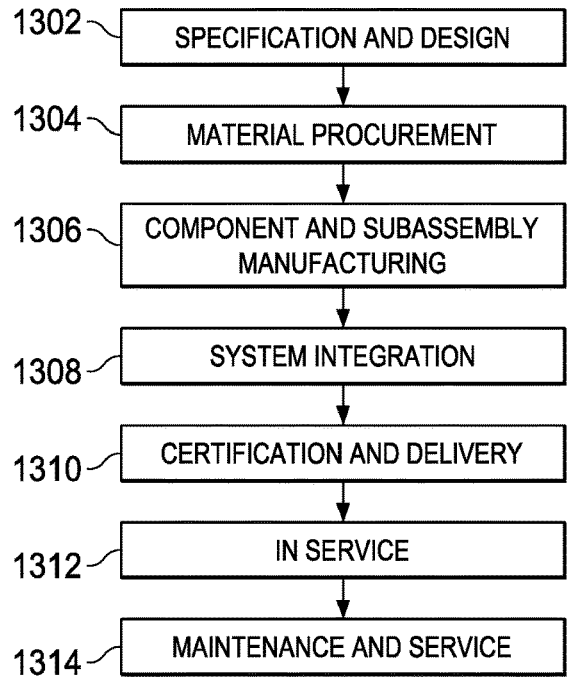
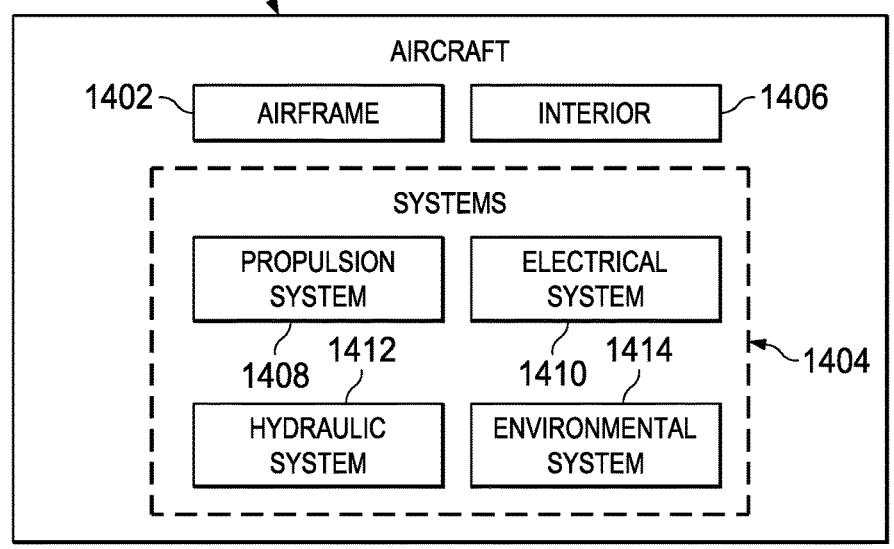

FORMATION OF THERMOPLASTIC PARTS

BACKGROUND INFORMATION

1. Field

The present disclosure relates generally to the formation of thermoplastic parts and, in particular, to the formation of a protective removable element. More specifically, the present disclosure relates to a method and apparatus for forming a thermoplastic part from a thermoplastic sheet.

2. Background

Polymeric materials may be used in a variety of products including some aircraft interior parts. A polymeric material may take the form of a thermoplastic or thermoset material. A thermoplastic material may be a polymer that becomes pliable or moldable above a selected temperature and returns to a solid-state upon cooling. A thermoplastic material may be able to be repeatedly heated and cooled. A thermoset material may become hard when heated. A thermoset material may be irreversibly cured when heated.

Polymeric materials may be formed into parts using a variety of methods including extrusion, pultrusion, additive manufacturing, and molding. Forming parts using extrusion or pultrusion may limit the shapes of parts created. Further, extrusion or pultrusion may have undesirable tooling costs.

Forming parts from polymeric materials using additive manufacturing may result in parts having undesirable properties. For example, additive manufacturing may result in parts having discrete layers. Further, additive manufacturing techniques may limit the polymeric materials which may be used to form parts.

Molds used in molding polymeric materials may be created from metals using milling or other material removal processes. Molds may be formed from metals as metal molds may be used in molding polymeric materials multiple times without undesirable effects on the mold. However, creating metal molds may be undesirably expensive. Further, creating metal molds may require undesirable amounts of time. Yet further, storing metal molds may require undesirable amounts of space.

Accordingly, metal molds may be desirable for generating several similar polymeric parts. Further, cost per part of polymeric parts manufactured using metal molds may be decreased as the number of manufactured parts increases. However, forming a single unique part from polymeric materials may be undesirably expensive or time-consuming.

Therefore, it would be desirable to have a method and apparatus that take into account at least some of the issues discussed above, as well as other possible issues.

SUMMARY

An illustrative embodiment of the present disclosure may provide a protective removable element. The protective removable element may comprise a thermoplastic material of uniform thickness formed into a molded shape configured to adhere to an exterior shape of a surface of a part. The molded shape may comprise an interior shape having features configured to adhere the protective removable element to the part.

Another illustrative embodiment of the present disclosure may provide a method. A portion may be cut from a thermoplastic sheet of a first thermoplastic material based on a three dimensional model. The portion may be secured to a mold. The portion and the mold may be heated under vacuum to form a structure.

Yet another illustrative embodiment of the present disclosure may provide a method. A surface of a part may be identified from a three dimensional model of the part. A surface shape for a mold surface may be designed based on the three dimensional model. The surface shape may be modified to form a modified surface shape. A mold may be formed based on the modified surface shape using additive manufacturing. A flat shape may be designed based on the three dimensional model. The flat shape may be cut from a thermoplastic sheet to form a portion. The portion may be secured to the mold. The portion and the mold may be heated under vacuum to form a structure.

A further illustrative embodiment of the present disclosure may provide an apparatus. The apparatus comprises a designer, a shape generator, and a molding system. The designer may be configured to identify a surface of a part and create a flat shape for a structure designed to cover the surface of the part. The shape generator may be configured to form a portion from a thermoplastic sheet using the flat shape. The molding system may be configured to form the protective structure designed to cover the surface of the part using the thermoplastic sheet having the flat shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 13 is an illustration of a block diagram of an aircraft manufacturing and service method in accordance with an illustrative embodiment; and FIG. 14 is an illustration of a block diagram of an aircraft in which an illustrative embodiment may be implemented.

DETAILED DESCRIPTION

Figure 1:
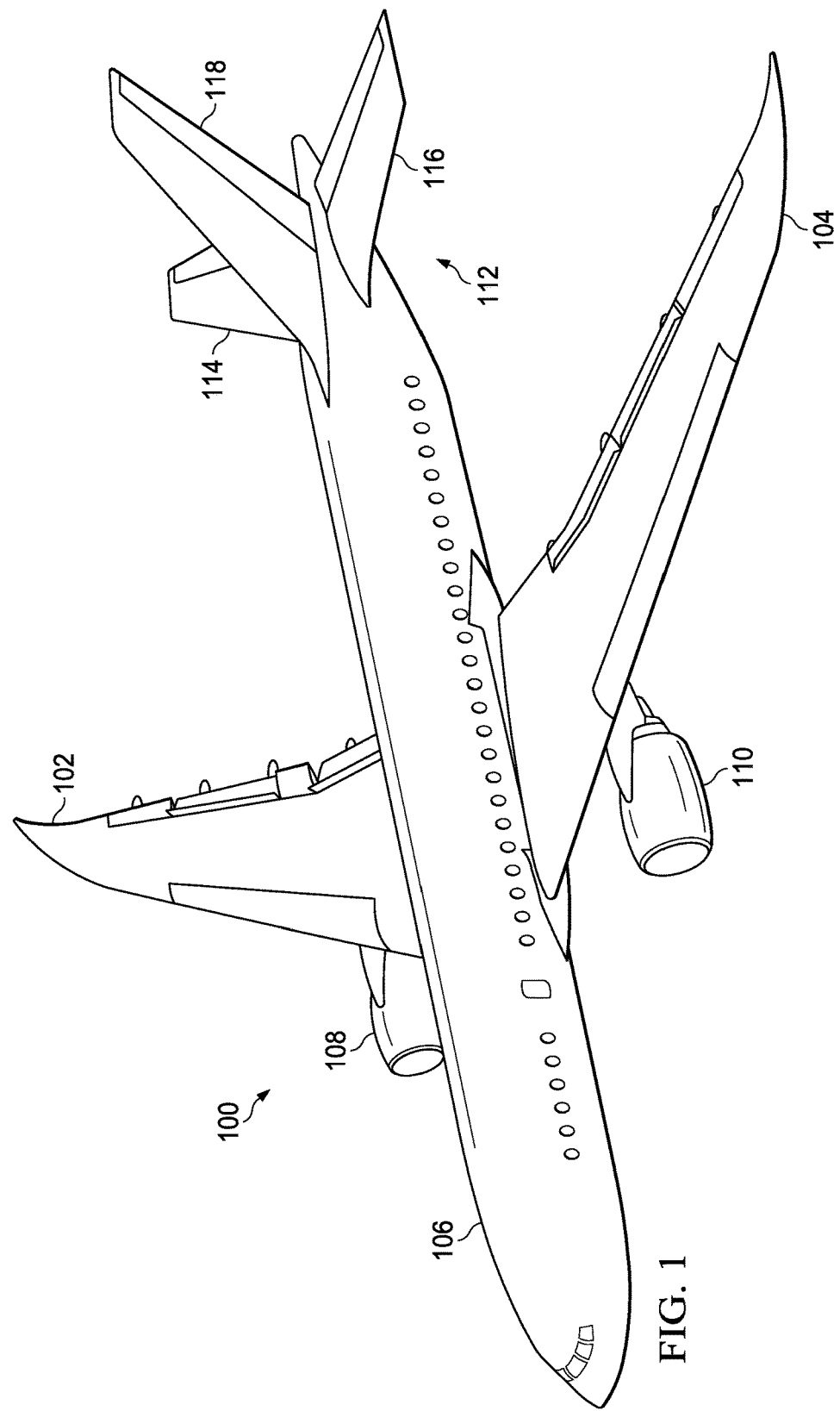
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a thermoplastic part may be implemented in accordance with an illustrative embodiment. For example, a thermoplastic part may be present in the passenger cabin within body 106. Further, a thermoplastic part may take the form of a protective covering for horizontal stabilizer 116 or horizontal stabilizer 114 during assembly and manufacturing. A protective covering is removed prior to use of aircraft 100.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
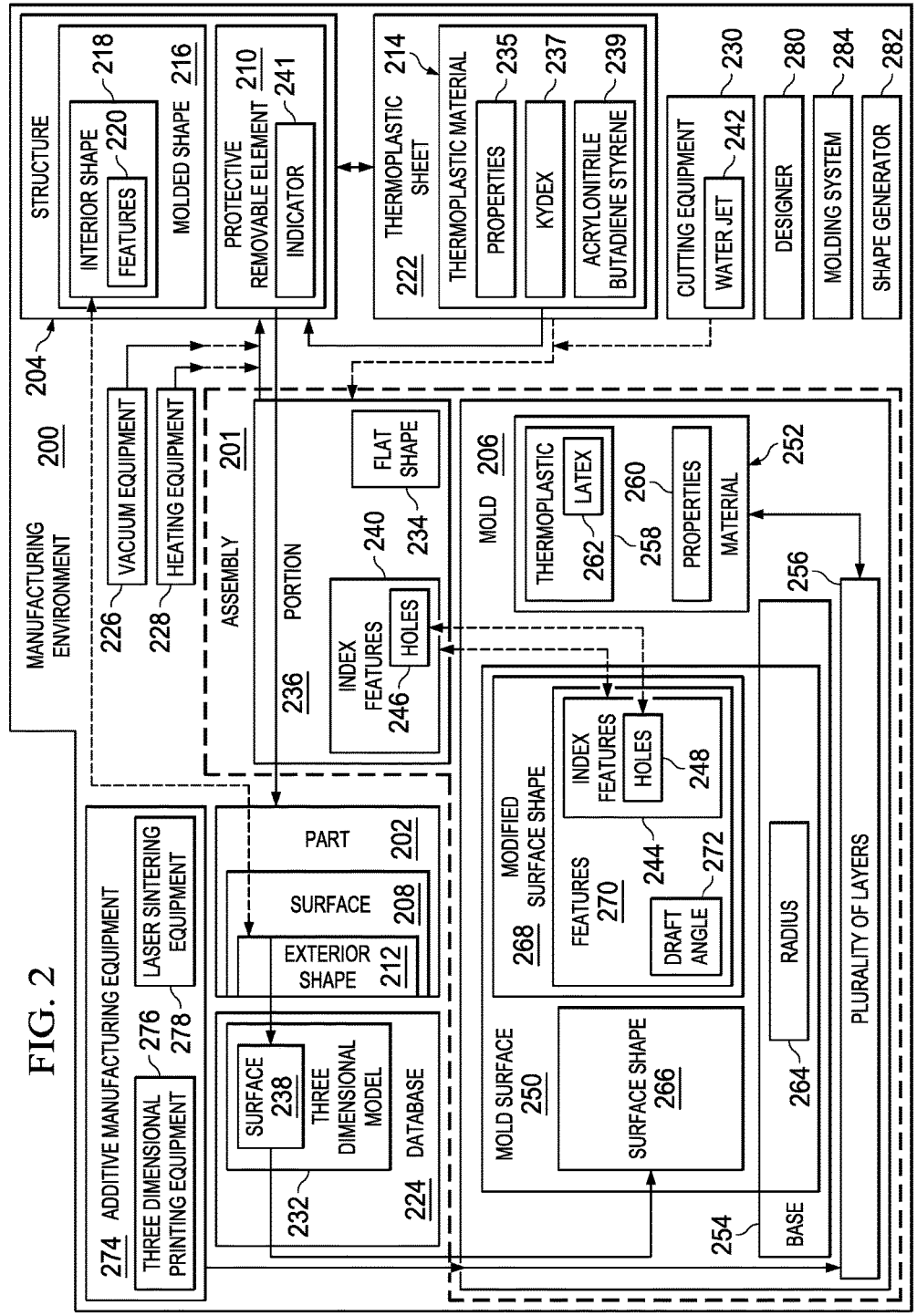
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In FIG. 2, manufacturing environment 200 is an example of one implementation of an environment in which thermoplastic parts may be formed. Manufacturing environment 200 is an example of one implementation for an environment for forming a thermoplastic part used in aircraft 100 in FIG. 1.

As depicted, manufacturing environment 200 includes assembly 201, part 202, structure 204, and mold 206. In some illustrative examples, assembly 201 may include mold 206. In some illustrative examples, a protective removable element, such as protective removable element 210, may be desirable to cover all or portions of part 202. Specifically, it may be desirable to place a protective removable element such as protective removable element 210 over surface 208 of part 202. A protective removable element may protect surface 208 of part 202 from scratching or generation of other undesired inconsistencies during transit of part 202 or during other times prior to use. After transit and before use of part 202, the protective removable element may be removed. In these illustrative examples, structure 204 may be manufactured to form protective removable element 210 to be placed over surface 208 of part 202. Protective removable element 210 may also be referred to as a protective covering or a protective structure. Surface 208 of part 202 may have exterior shape 212.

In these illustrative examples, structure 204 may be configured to adhere to exterior shape 212 of part 202. Structure 204 may be formed of thermoplastic material 214. Structure 204 may have molded shape 216. Molded shape 216 of structure 204 may have interior shape 218 with features 220. Features 220 may be configured to adhere structure 204 to exterior shape 212 of surface 208 of part 202. Structure 204 may be formed from thermoplastic sheet 222 according to methods of the current disclosure. In illustrative examples in which structure 204 is formed from thermoplastic sheet 222, thermoplastic material 214 of structure 204 may have a uniform thickness. In some illustrative examples, part 202 may be desirably a thermoplastic part. In these illustrative examples, part 202 is formed by structure 204. In these illustrative examples, part 202 may be manufactured from thermoplastic sheet 222 according to methods of the current disclosure.

Manufacturing environment 200 may include equipment to form structure 204. As depicted, manufacturing environment 200 includes database 224, vacuum equipment 226, heating equipment 228, cutting equipment 230, designer 280, shape generator 282, and molding system 284.

Database 224 may contain three dimensional model 232 of part 202. Structure 204 may be formed based on three dimensional model 232. Specifically, flat shape 234 may be designed based on three dimensional model 232. In some illustrative examples, designer 280 is configured to identify surface 208 of part 202 and create flat shape 234 for structure 204 designed to cover surface 208 of part 202.

Flat shape 234 may be cut from thermoplastic sheet 222 to form portion 236. When portion 236 having flat shape 234 is molded on mold 206, structure 204 may be formed having molded shape 216. Molded shape 216 may be based on surface 238 of three dimensional model 232.

In illustrative examples in which structure 204 takes the form of protective removable element 210 for part 202, molded shape 216 may be configured to cover surface 208. Surface 238 may be a three dimensional design of surface 208. As a result, in these illustrative examples, molded shape 216 may be configured to cover surface 238. In these illustrative examples, interior shape 218 of molded shape 216 may have features 220 configured to adhere structure 204 to surface 238. Protective removable element 210 may include indicator 241. Indicator 241 may indicate that protective removable element 210 should be removed prior to use of part 202. In illustrative examples in which part 202 is formed by structure 204, molded shape 216 may be substantially similar to surface 238. For example, molded shape 216 may be the same as surface 238 but with index features 240 added for securing flat shape 234 to mold 206.

Portion 236 may be formed by shape generator 282. Shape generator 282 is configured to form portion 236 from thermoplastic sheet 222 using flat shape 234. Flat shape 234 may be cut from thermoplastic sheet 222 using cutting equipment 230. Cutting equipment 230 may be selected based on at least one of cutting speed, cutting accuracy, resulting edge roughness, and heat generated during cutting. Cutting equipment 230 may take the form of water jet 242. Water jet 242 may be faster than cutting flat shape 234 from thermoplastic sheet 222 by hand. In other examples, cutting equipment 230 may take the form of a laser cutter, a hot gas cutter, a router, a saw, perforation equipment, punching equipment, scoring equipment, or other suitable equipment. A saw may take the form of a circular saw, a band saw, a saber, a jig saw, or other suitable saws.

Flat shape 234 is cut from thermoplastic sheet 222 and formed into structure 204. As a result, structure 204 is formed of thermoplastic material 214. Thermoplastic material 214 has properties 235. Properties 235 may include ductility, toughness, permeability, water resistance, chemical resistance, anti-bacterial properties, maintenance properties, surface adhesion, transparency, or other desirable properties. In some illustrative examples, thermoplastic material 214 may be Kydex 237. Kydex 237 is an acrylic/PVC alloy. Kydex 237 may be selected based on the toughness of the material. Kydex 237 may be selected based on the ductility of the material. In some illustrative examples, thermoplastic material 214 may be acrylonitrile butadiene styrene 239. Acrylonitrile butadiene styrene 239 is formed from acrylonitrile, butadiene, and styrene. In some illustrative examples, thermoplastic material 214 may be referred to as a second thermoplastic material.

After portion 236 having flat shape 234 is cut from thermoplastic sheet 222, portion 236 may be secured to mold 206. Portion 236 may be secured to mold 206 using index features 240 of portion 236 and index features 244 of mold 206. In some examples, index features 240 may take the form of holes 246. In some examples, index features 244 may take the form of holes 248. In these examples, fasteners may be placed through holes 246 and holes 248 to secure flat shape 234 to mold 206.

Molding system 284 is configured to form protective removable element 210 designed to cover surface 208 of part 202 using thermoplastic sheet 222 having flat shape 234. In some illustrative examples, molding system 284 may include at least one of vacuum equipment 226, heating equipment 228, and mold 206.

Vacuum equipment 226 is configured to pull a vacuum over mold 206. Vacuum equipment 226 may include at least one of a vacuum source, a vacuum bag, a vacuum table, sealant, or other desirable vacuum materials. Vacuum equipment 226 may be used to draw a vacuum over mold 206 and portion 236 when portion 236 is secured to mold 206.

Heating equipment 228 is configured to heat portion 236 and mold 206. By heating portion 236 under vacuum while portion 236 is secured to mold 206, portion 236 may be formed to mold 206. Specifically, portion 236 may be formed to mold surface 250 to form structure 204.

Portion 236 and mold 206 may be heated to a temperature sufficient to soften thermoplastic material 214. Portion 236 and mold 206 may be heated to a temperature below the melting point of material 252 of mold 206.

Mold 206 has base 254 and mold surface 250 and may be formed of plurality of layers 256 of material 252. Material 252 may be thermoplastic 258. Thermoplastic 258 may be selected to have properties 260. Properties 260 may include strength, stiffness, melting temperature, material cost, and any other desirable properties. Specifically, thermoplastic 258 may be selected to have a melting temperature higher than the softening temperature of thermoplastic material 214 of structure 204. Thermoplastic 258 may be selected to have a melting temperature higher than the melting temperature of thermoplastic material 214 of structure 204. Further, thermoplastic 258 may be selected such that mold 206 may be formed through additive manufacturing processes. In some illustrative examples, thermoplastic 258 is latex 262. In some examples, thermoplastic 258 may be referred to as a first thermoplastic material. In some illustrative examples, mold 206 may be formed of a material other than thermoplastic 258.

Base 254 of mold 206 is designed to have radius 264. Radius 264 is configured to prevent vacuum equipment 226 from forming independent radiuses. For example, a vacuum bag may form independent radiuses or wrinkles on molds having intersections between surfaces.

Mold surface 250 has a surface shape 266 designed based on surface 238 of three dimensional model 232. Surface shape 266 may be modified to form modified surface shape 268. Mold 206 may be formed based on modified surface shape 268.

Modified surface shape 268 has features 270. Features 270 are present in modified surface shape 268 but not in surface shape 266. Features 270 may be present in modified surface shape 268 to modify molded shape 216 of structure 204. Features 270 may be present in modified surface shape 268 to influence the molding process. For example, features 270 may facilitate removal of structure 204 from mold 206 after molding. Features 270 include draft angle 272 and index features 244. Index features 244 may take the form of holes 248.

Draft angle 272 may facilitate removal of structure 204 from mold 206. Draft angle 272 forms features 220 of interior shape 218 configured to adhere structure 204 to part 202. Specifically, draft angle 272 forms interior shape 218 so that interior shape 218 squeezes exterior shape 212 of surface 208 of part 202. As a result, protective removable element 210 adheres to part 202 without fasteners or adhesives as a result of draft angle 272.

Manufacturing environment 200 includes equipment to form mold 206. As depicted, manufacturing environment 200 includes additive manufacturing equipment 274. Mold 206 may be formed using additive manufacturing equipment 274. Conventional machining processes may form structures by removing material. Additive manufacturing processes form structures by adding material. Specifically, additive manufacturing processes may form structures by adding consecutive and discrete layers.

Additive manufacturing equipment 274 may take the form of at least one of three dimensional printing equipment 276, laser sintering equipment 278, or any other desirable additive manufacturing equipment.

In one illustrative example, additive manufacturing equipment 274 may form mold 206 by sequentially forming plurality of layers 256. The thickness of each of plurality of layers 256 may depend on the resolution of additive manufacturing equipment 274. Additive manufacturing equipment 274 may form mold 206 from material 252.

By forming mold 206 using additive manufacturing equipment 274, structure 204 and mold 206 may be manufactured in a desirable amount of time. Specifically, in some examples, structure 204 and mold 206 may be manufactured in the same day. Further, forming mold 206 using additive manufacturing equipment 274 may have lower manufacturing costs than conventional metal molds. Because mold 206 may be manufactured for desirable costs and in a desirable amount of time, mold 206 may be created for a single use.

Figure 3:
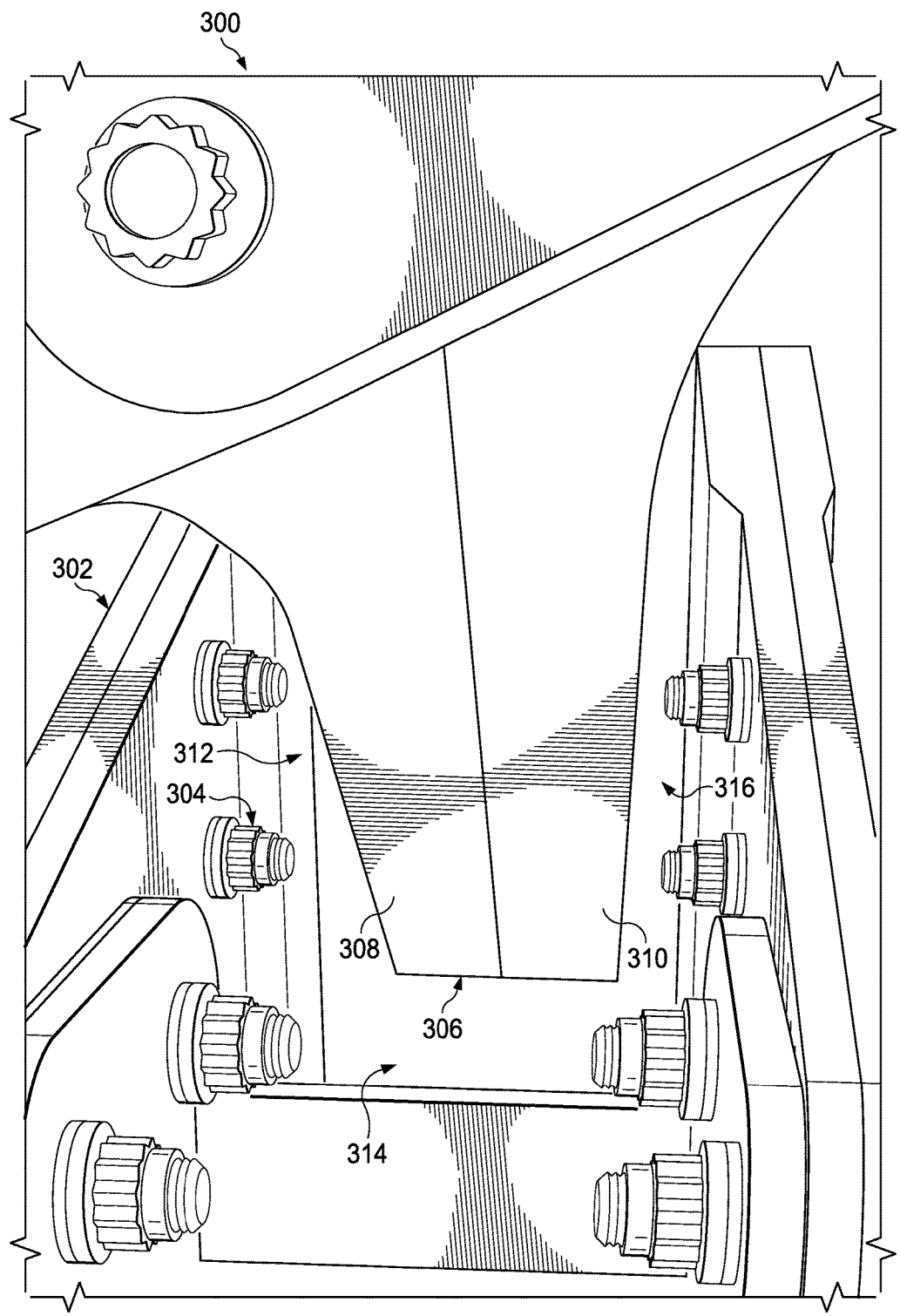
FIG. 3 is an illustration of an aircraft structure in which a protective covering may be desirable in accordance with an illustrative embodiment.

Turning now to FIG. 3, an illustration of an aircraft structure in which a protective covering may be desirable is depicted in accordance with an illustrative embodiment. Aircraft structure 300 has flanges 302, bolts 304, and protrusion 306. As depicted, aircraft structure 300 is a portion of a horizontal stabilizer on an aircraft such as horizontal stabilizer 114 of aircraft 100 in FIG. 1.

Protrusion 306 is positioned within flanges 302. As aircraft structure 300 is moved, bolts 304 may have a tendency to scratch surface 308 and surface 310 of protrusion 306. As a result, the quality of aircraft structure 300 may be less than desired, possibly requiring replacement or rework.

To protect surface 308 and surface 310 from bolts 304, it may be desirable to place protective removable equipment around protrusion 306. However, space 312, space 314, and space 316 may prohibit the use of traditional protective equipment which may include a foam material and covering. Further, the traditional protective equipment may be prone to ripping or tearing in this instance, causing an undesirable amount of replacement.

Accordingly, another design of protective equipment may be desired. Further, it may be desirable to form the protective equipment quickly and inexpensively.

Figure 4:
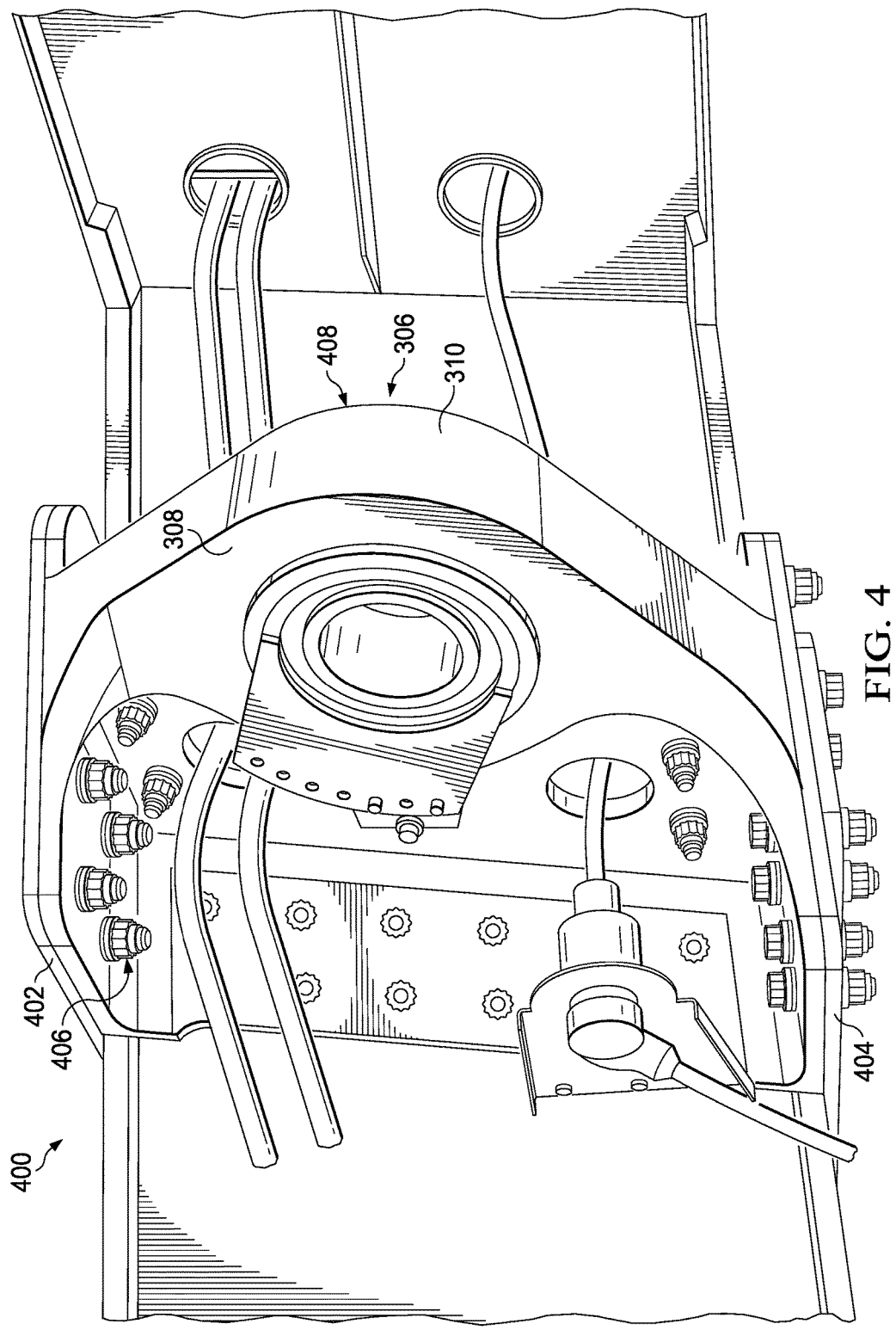
FIG. 4 is an illustration of an aircraft part over which a protective covering may be desirable in accordance with an illustrative embodiment.

Turning now to FIG. 4, an illustration of an aircraft part over which a protective covering may be desirable is depicted in accordance with an illustrative embodiment. Aircraft part 400 as depicted includes protrusion 306 of FIG. 3 having surface 308 and surface 310. Aircraft part 400 also has portion 402, portion 404, and bolts 406. It may be desirable to cover surface 408 of aircraft part 400 by a protective covering. Surface 408 includes surface 308 and surface 310 of protrusion 306.

Figure 5:
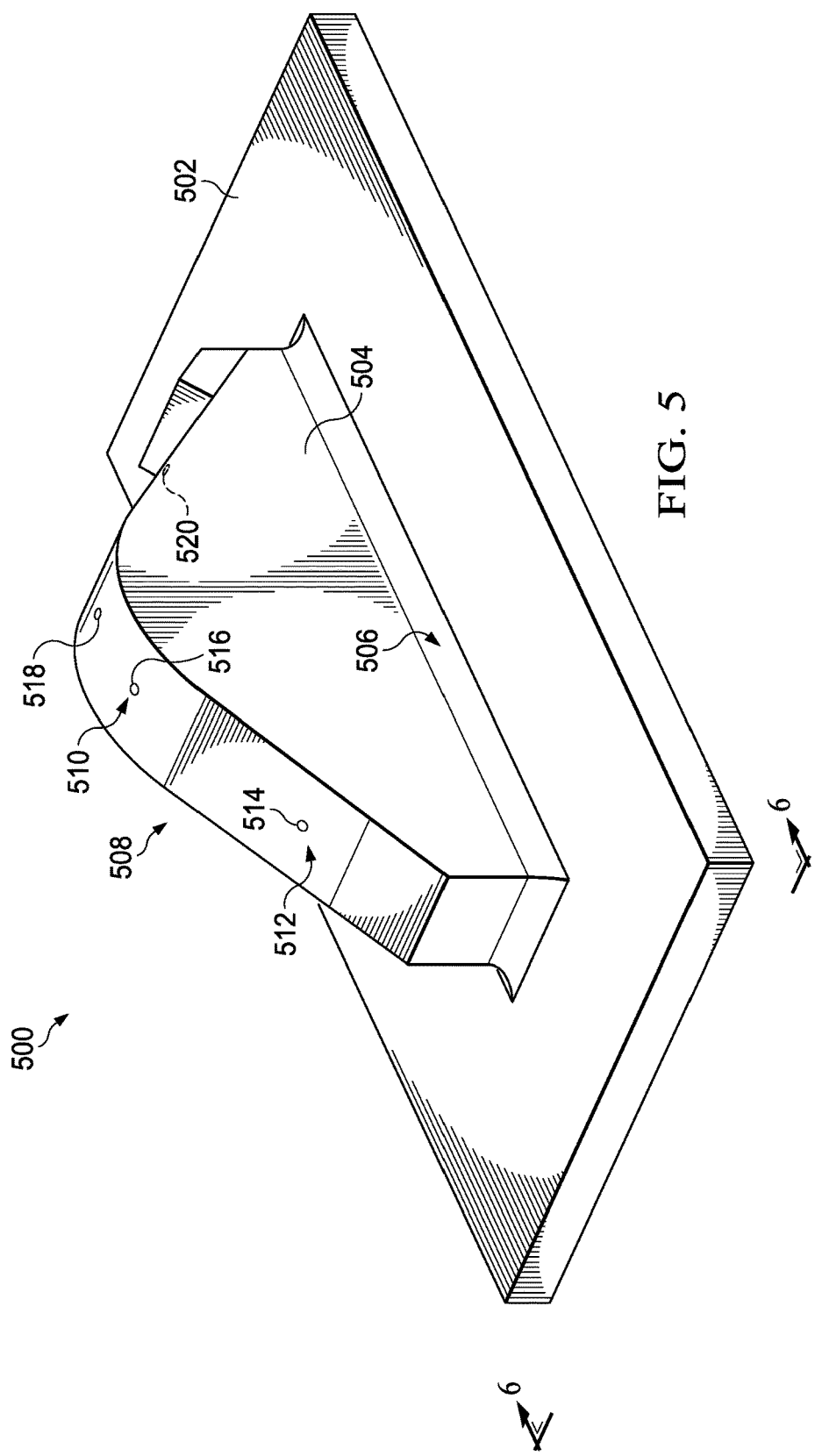
FIG. 5 is an illustration of a mold in accordance with an illustrative embodiment.

Turning now to FIG. 5, an illustration of a mold is depicted in accordance with an illustrative embodiment. Mold 500 is an example of a physical implementation of mold 206 shown in block form in FIG. 2. In this illustrative example, mold 500 may be used to form a protective removable element such as protective removable element 210 of FIG. 2.

As depicted, mold 500 may be formed of a plurality of layers of material deposited by additive manufacturing equipment such as additive manufacturing equipment 274 of FIG. 2. Mold 500 may be formed of a thermoplastic material, such as thermoplastic material 214 of FIG. 2. Mold 500 has base 502 and mold surface 504. Base 502 has radius 506. Radius 506 is configured to prevent vacuum equipment from forming independent radiuses. For example, a vacuum bag may form independent radiuses or wrinkles on molds having intersections between surfaces.

Mold surface 504 has modified surface shape 508. Modified surface shape 508 includes index features 510. Index features 510 take the form of holes 512 in this example. Holes 512 include hole 514, hole 516, hole 518, and hole 520.

Figure 6:
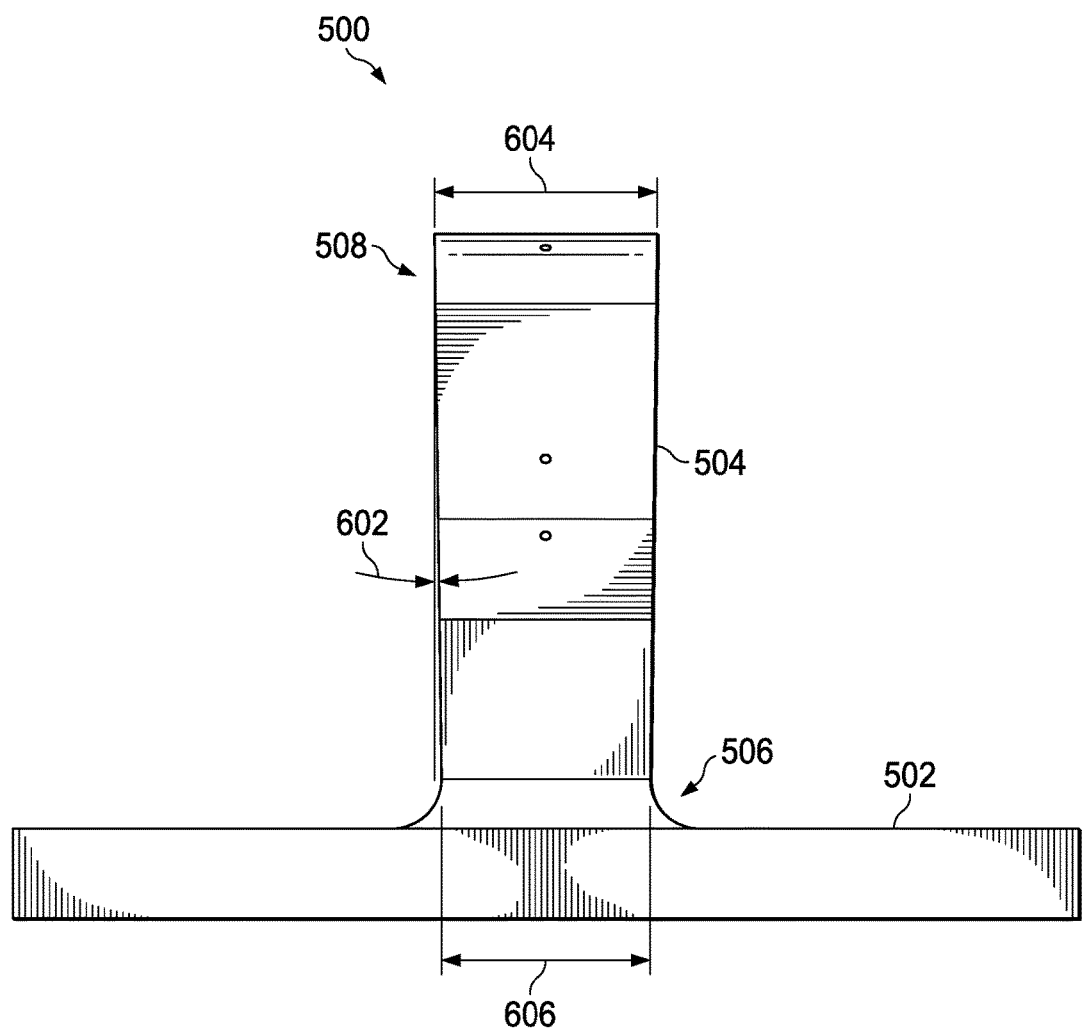
FIG. 6 is an illustration of a front view of a mold in accordance with an illustrative embodiment.

Turning now to FIG. 6, an illustration of a front view of a mold is depicted in accordance with an illustrative embodiment. Specifically, FIG. 6 is a view of mold 500 from direction 6-6 of FIG. 5.

As can be seen from FIG. 6, modified surface shape 508 also includes draft angle 602. Draft angle 602 is a taper of modified surface shape 508 of mold 500. Specifically, mold 500 tapers from width 604 to width 606 in draft angle 602. Draft angle 602 is configured to allow ease of removal of material from mold 500. Further, draft angle 602 may be configured to form features in a structure on mold 500. The features formed in the structure may adhere the structure to the part upon which mold 500 is based.

Figure 7:
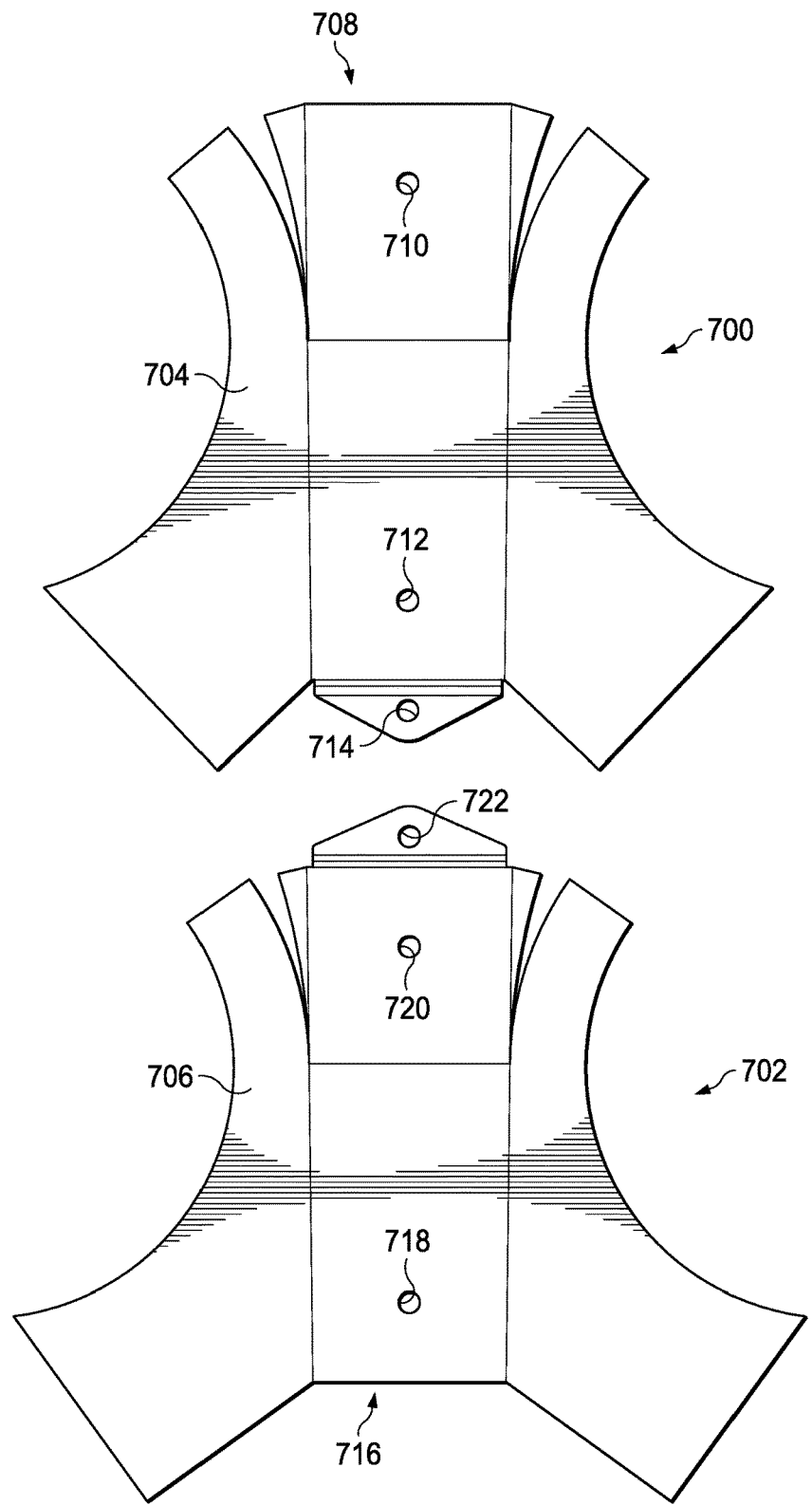
FIG. 7 is an illustration of two portions having flat shapes in accordance with an illustrative embodiment.

Turning now to FIG. 7, an illustration of two portions having flat shapes is depicted in accordance with an illustrative embodiment. Portion 700 and portion 702 may be implementations of portion 236 of FIG. 2. Portion 700 has flat shape 704. Portion 702 has flat shape 706. After molding, portion 700 and portion 702 may form a protective cover for a part such as part 202 of FIG. 2.

Flat shape 704 has index features 708. Index features 708 include hole 710 and hole 712. Index features 708 may be used to secure flat shape 704 to a mold such as mold 500 of FIG. 5. Hole 714 may function as an indicator such as indicator 241 of FIG. 2. Specifically, hole 714 may be used to hold a tag or other structure to identify the protective cover. Hole 714 may be used to hold a tag or other structure to remind operators to remove the protective cover.

Flat shape 706 has index features 716. Index features 716 include hole 718 and hole 720. Index features 716 may be used to secure flat shape 706 to a mold such as mold 500 of FIG. 5. Hole 722 may function as an indicator such as indicator 241 of FIG. 2. Specifically, hole 722 may be used to hold a tag or other structure to identify the protective cover. Hole 722 may be used to hold a tag or other structure to remind operators to remove the protective cover.

Figure 8:
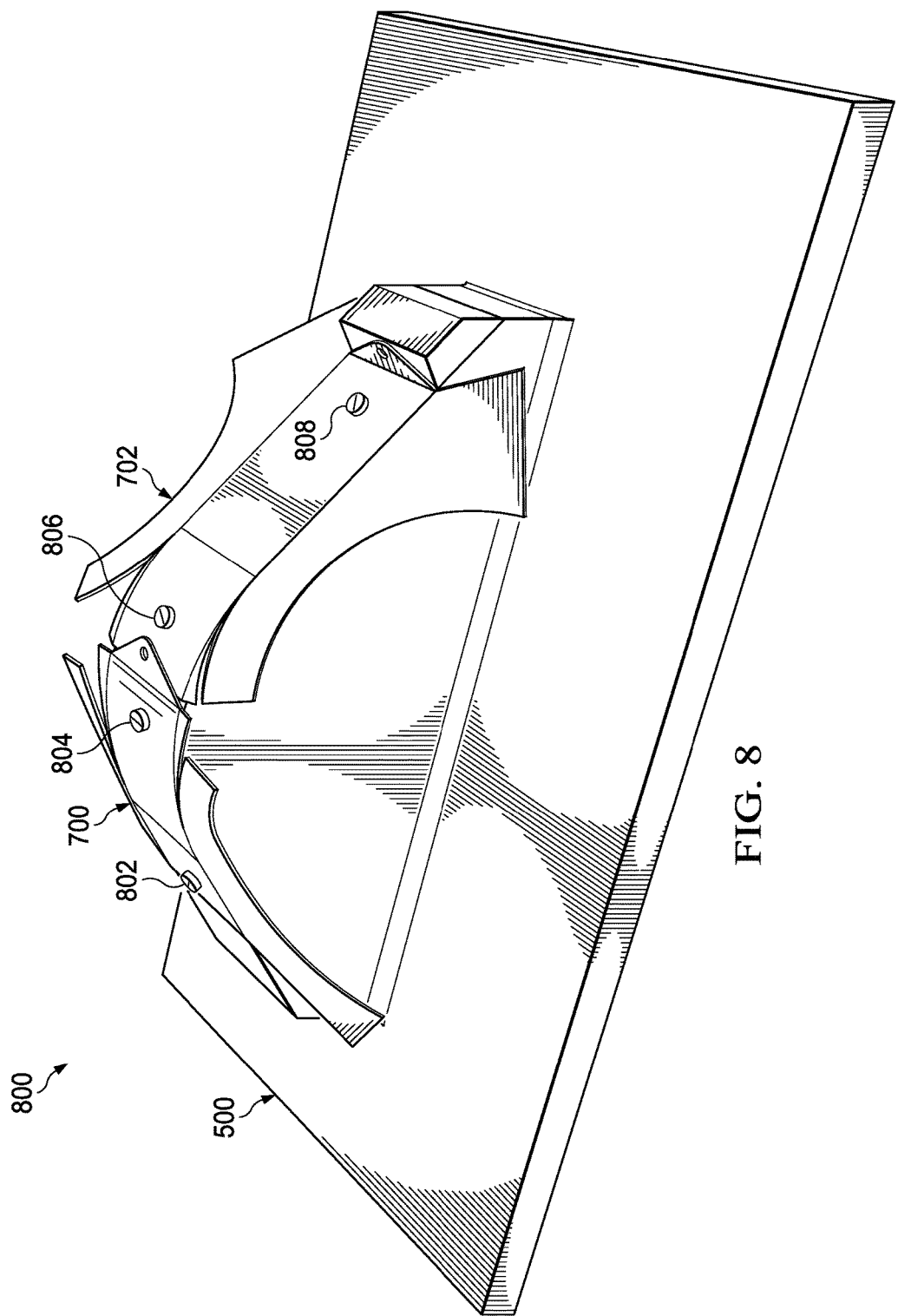
FIG. 8 is an illustration of two portions fastened on a mold in accordance with an illustrative embodiment.

Turning now to FIG. 8, an illustration of two portions fastened on a mold is depicted in accordance with an illustrative embodiment. As depicted, portion 700 and portion 702 of FIG. 7 are secured to mold 500 of FIG. 5 to form assembly 800. Portion 700 is secured to mold 500 by fastener 802 and fastener 804. Fastener 802 is placed through hole 710 of portion 700 and hole 514 of mold 500. Fastener 804 is placed through hole 712 of portion 700 and hole 516 of mold 500. Fastener 806 is placed through hole 720 of portion 702 and hole 518 of mold 500. Fastener 808 is placed through hole 718 of portion 702 and hole 520 of mold 500.

After securing portion 700 and portion 702 to mold 500, vacuum equipment such as vacuum equipment 226 of FIG. 2 may be positioned over assembly 800. Assembly 800 may then be heated under vacuum to form a structure. Assembly 800 may be heated to a temperature below the melting temperature of the thermoplastic material of mold 500. Assembly 800 may be heated to a temperature sufficient to soften the thermoplastic material of portion 700 and portion 702.

Figure 9:
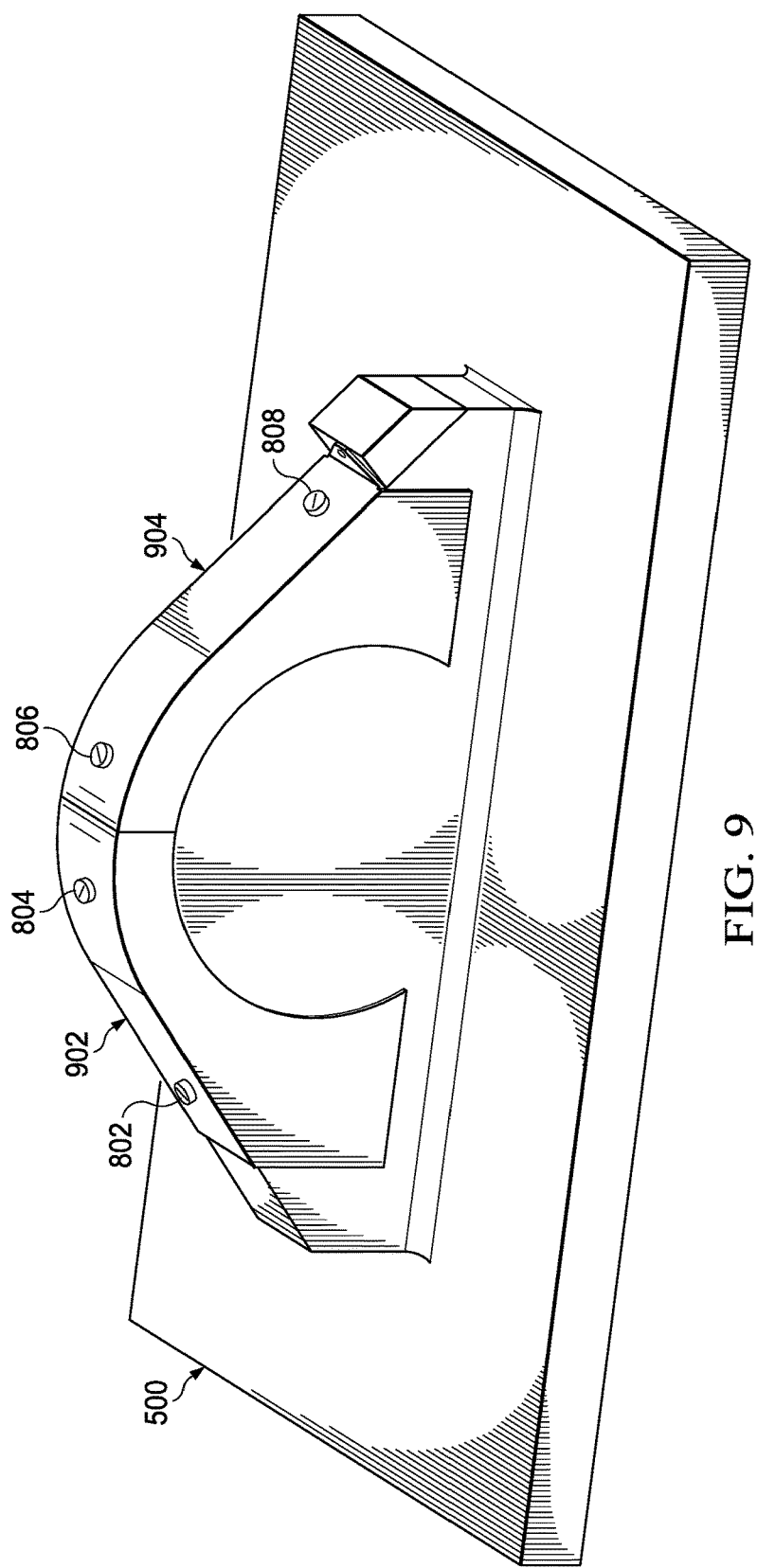
FIG. 9 is an illustration of two structures formed onto a mold in accordance with an illustrative embodiment.

Turning now to FIG. 9, an illustration of two structures formed onto a mold is depicted in accordance with an illustrative embodiment. Structure 902 and structure 904 may be physical implementations of structure 204 of FIG. 2. Structure 902 and structure 904 are formed from portion 700 and portion 702 with heating under vacuum. Since structure 902 and structure 904 are formed to mold 500, accordingly, each of structure 902 and structure 904 have interior shapes based on mold surface 504. Structure 902 and structure 904 may form a protective covering on a part by placing structure 902 and structure 904 over a surface of the part.

Figure 10:
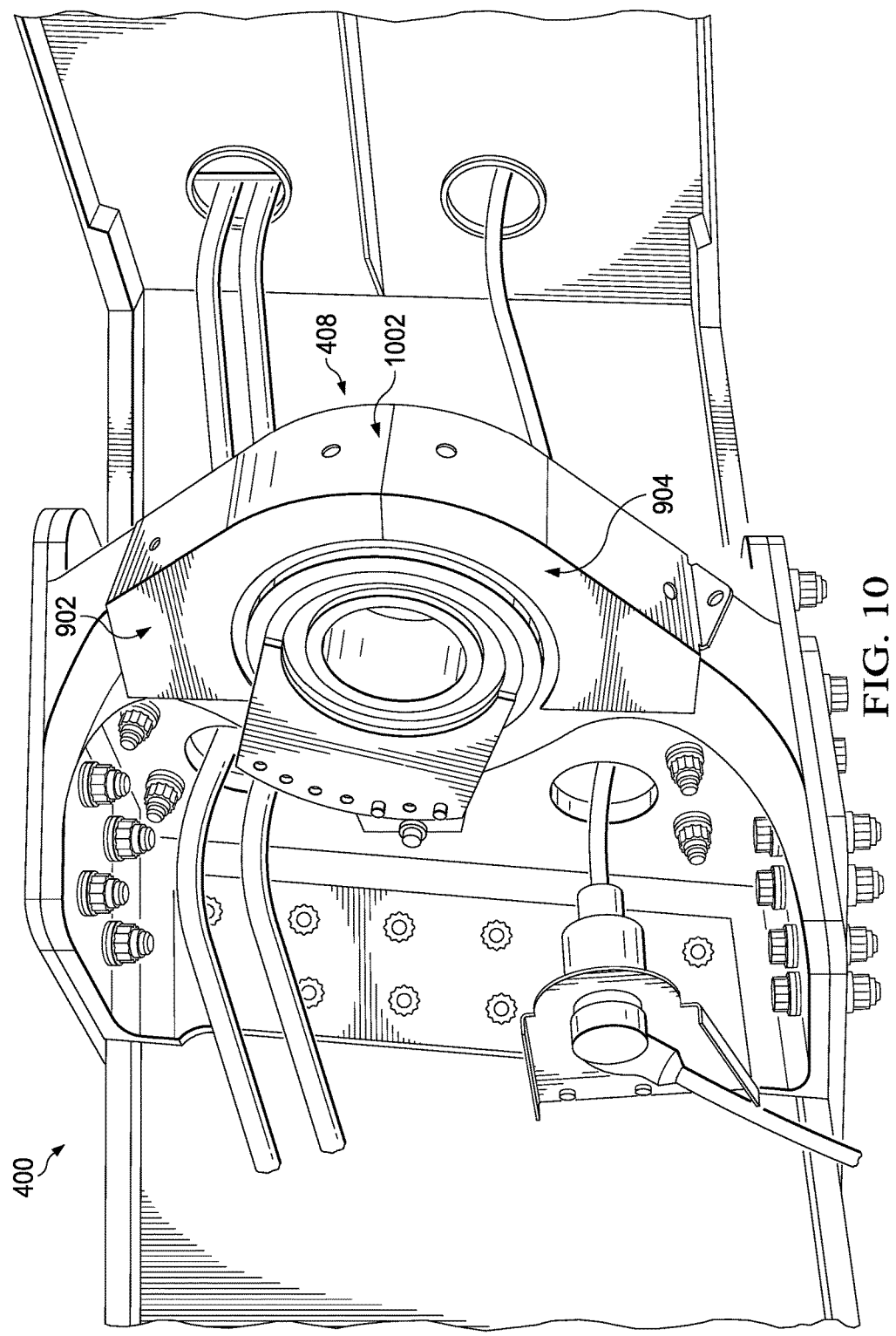
FIG. 10 is an illustration of two structures placed on an aircraft part in accordance with an illustrative embodiment.

FIG. 10 is an illustration of two structures placed on an aircraft part in accordance with an illustrative embodiment. Specifically, structure 902 and structure 904 may be positioned on aircraft part 400. Structure 902 and structure 904 may form protective removable element 1002 covering surface 408 of aircraft part 400. Structure 902 and structure 904 may be adhered to surface 408 of aircraft part 400 based on the respective shapes of structure 902 and structure 904.

Figure 11:
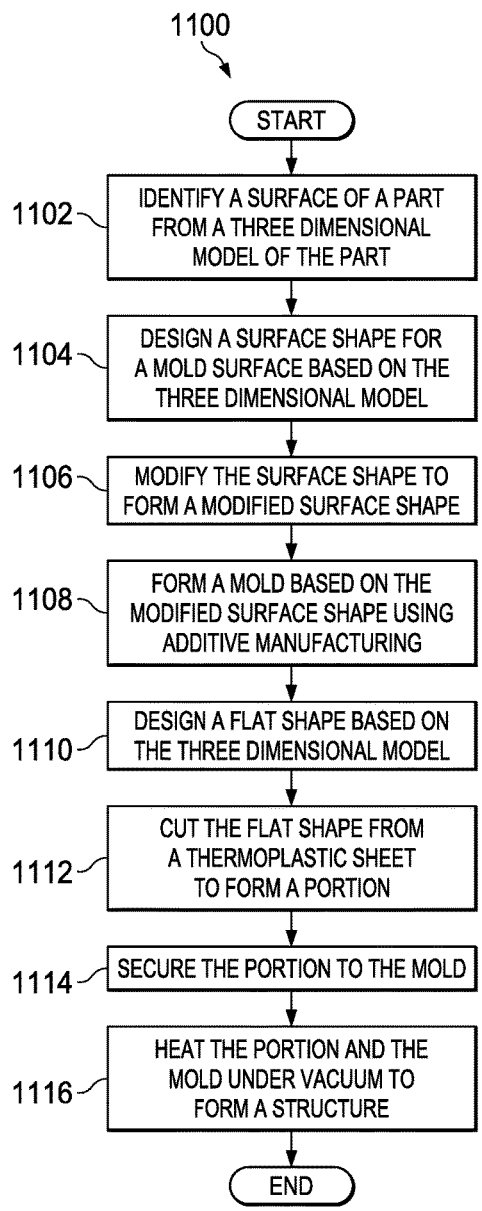
FIG. 11 is an illustration of a flowchart of a process for forming a thermoplastic part in accordance with an illustrative embodiment.

Turning now to FIG. 11, an illustration of a flowchart of a process for forming a thermoplastic part is depicted in accordance with an illustrative embodiment. The process illustrated in FIG. 11 may be implemented to form a thermoplastic part. In some illustrative examples, the thermoplastic part may take the form of a protective covering. The process illustrated in FIG. 11 may be implemented to form structure 204 of FIG. 2.

The process begins by identifying surface 238 of part 202 from three dimensional model 232 of part 202 (operation 1102). The process then designs surface shape 266 for mold surface 250 based on three dimensional model 232 (operation 1104). The process next modifies surface shape 266 to form modified surface shape 268 (operation 1106). In some illustrative examples, modifying the surface shape to form a modified surface shape introduces features to influence radiusing of a vacuum bag during heating. In these illustrative examples, the features may include radius 264 of FIG. 2. In some illustrative examples, modifying the surface shape to form a modified surface shape introduces features to decrease an interior shape of the structure. In these illustrative examples, the features may include draft angle 272 of FIG. 2 which influences interior shape 218 of FIG. 2.

The process then forms mold 206 based on modified surface shape 268 using additive manufacturing (operation 1108). For example, mold 206 may be formed using additive manufacturing equipment 274 of FIG. 2. In some illustrative examples, forming a mold based on the modified surface shape using additive manufacturing comprises forming a mold of a thermoplastic material using laser sintering, the mold having a base, a radius, and the mold surface.

The process then designs a flat shape based on three dimensional model 232 (operation 1110). The flat shape may be flat shape 234 of FIG. 2. Flat shape 234 of FIG. 2 may be designed based on surface 238 of three dimensional model 232. The process then cuts flat shape 234 from thermoplastic sheet 222 to form a portion (operation 1112). The portion may be portion 236 of FIG. 2 cut from thermoplastic sheet 222. The process next secures portion 236 to mold 206 (operation 1114). The process then heats portion 236 and mold 206 under vacuum to form structure 204 (operation 1116). Afterward, the process terminates.

In some illustrative examples, after forming the structure, the structure may be placed over the surface of the part. In these illustrative examples, the structure may take the form of a protective covering.

Figure 12:
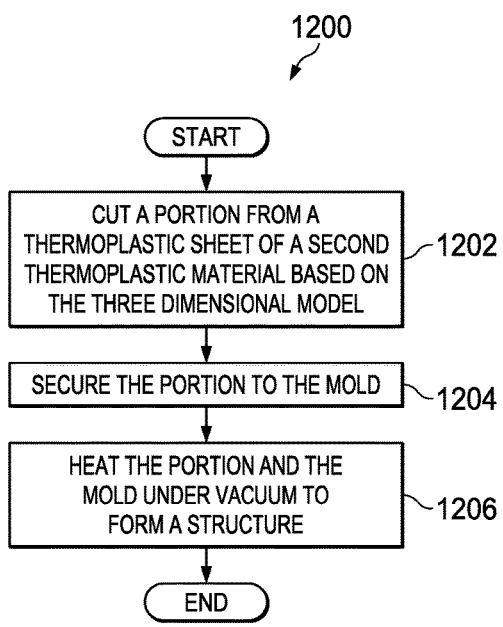
FIG. 12 is an illustration of a flowchart of a process for forming a thermoplastic part in accordance with an illustrative embodiment.

FIG. 12 is an illustration of a flowchart of a process for forming a thermoplastic part in accordance with an illustrative embodiment. The process illustrated in FIG. 12 may be implemented to form a thermoplastic part. In some illustrative examples, the thermoplastic part may take the form of protective covering. The process illustrated in FIG. 12 may be implemented to form structure 204 of FIG. 2.

The process begins by cutting portion 236 from thermoplastic sheet 222 of a second thermoplastic material based on three dimensional model 232 (operation 1202). Portion 236 may be cut from thermoplastic sheet 222 using any desirable cutting equipment, such as cutting equipment 230 of FIG. 2. In some examples, portion 236 may be cut using a water jet such as water jet 242 of FIG. 2.

The process then secures portion 236 to mold 206 (operation 1204). Portion 236 may be secured to mold 206 using index features of the portion and index features of the mold. In some illustrative examples, fasteners may be inserted into holes of portion 236 and holes of mold 206. The process then heats portion 236 and mold 206 under vacuum to form structure 204 (operation 1206). In some illustrative examples, heating portion 236 and mold 206 under vacuum to form structure 204 comprises heating portion 236 and mold 206 to a temperature lower than the melting temperature of first thermoplastic material but sufficient to soften second thermoplastic material. Afterward, the process terminates.

In some illustrative examples, after forming structure 204, structure 204 may be placed over surface 208 of part 202. In these examples, structure 204 forms a protective covering on part 202.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in the form of a block diagram in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in the form of a block diagram in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. Further, apparatuses and methods embodied herein may be employed to form portions of aircraft 1400 in FIG. 14. For example, one or more illustrative embodiments may be used to form portions of airframe 1402 or interior 1406 of aircraft 1400.

One or more illustrative embodiments may be used during at least one of component and subassembly manufacturing 1306 and system integration 1308, certification and delivery 1310, or maintenance and service 1314. For example, one or more illustrative embodiments may be used during component and subassembly manufacturing 1306. When structure 204 is part 202 in FIG. 2, part 202 may be used during component and subassembly manufacturing 1306. Specifically, part 202 may be a part of an aircraft interior such as a luggage bin covering or an armrest. Further, structure 204 may also be used to perform replacements during maintenance and service 1314. For example, structure 204 may be used as protective removable element 210 to protect part 202 to replace a part during scheduled maintenance for aircraft 1400.

By using additive manufacturing to form a mold, the mold may have desirable properties. Specifically, the use of additive manufacturing may form molds in a desirable time, for a desirable price. Accordingly, using additive manufacturing may allow for cost effective single use molding.

By forming a structure over a mold, the structure may have desirable properties. By forming a structure over a mold, properties of thermoplastic sheet 222 may be retained. Further, by forming a structure over a mold, the structure may be formed in a desirable time.

By using additive manufacturing equipment 274 to form mold 206, structure 204 may be manufactured using fewer resources than conventional methods such as pultrusion, extrusion, or molding using metal molds. For example, using additive manufacturing equipment 274 to form mold 206, structure 204 may be manufactured in less time. Additionally, using additive manufacturing equipment 274 to form mold 206, structure 204 may be manufactured with lower tooling cost. Thus, thermoplastic parts having desirable properties may be manufactured in a desirable time and for a desirable cost.

By forming structure 204 to have interior shape 218 with features 220, structure 204 may be protective removable element 210. Protective removable element 210 adheres to surface 208 of part 202 using features 220 without adhesives or fasteners. Protective removable element 210 protects part 202 from damage during transit and is removed prior to use of part 202. Protective removable element 210 may protect parts without being as bulky as traditional protective removable equipment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method of manufacturing a protective removable element of an aircraft part comprising:
   cutting a portion from a thermoplastic sheet of a first thermoplastic material based on a three dimensional model, wherein the portion approximates at least part of a geometric net of the three dimensional model;
   securing the portion to a mold; and
   heating the portion and the mold under vacuum to form the protective removable element.

2. The method of claim 1 further comprising:
   forming the mold of a second thermoplastic material based on the three dimensional model using additive manufacturing.

3. The method of claim 2 further comprising:
   identifying a surface of a part from the three dimensional model;
   designing a surface shape for a mold surface based on the three dimensional model; and
   modifying the surface shape to form a modified surface shape, wherein forming the mold comprises forming the mold of the second thermoplastic material using the modified surface shape using additive manufacturing.

4. The method of claim 3, wherein modifying the surface shape to form the modified surface shape further comprises:
   forming a draft angle in the modified surface shape relative to the surface shape; and
   forming at least one index feature in the modified surface shape, wherein the index feature is configured to position the portion on the mold.

5. The method of claim 2, wherein heating the portion and the mold under vacuum to form the structure comprises heating the portion and the mold to a temperature lower than a melting temperature of the second thermoplastic material but sufficient to soften the first thermoplastic material.

* * * * *